United States Patent
Sigg

[11] 3,881,444
[45] May 6, 1975

[54] MARINE DRIVE GEARING
[75] Inventor: Hans Sigg, Widen, Switzerland
[73] Assignee: Maag Gear Wheel & Machine Company, Zurich, Switzerland
[22] Filed: July 10, 1972
[21] Appl. No.: 270,461

[30] Foreign Application Priority Data
July 13, 1974 Germany............................ 2134972

[52] U.S. Cl.................... 115/37; 74/409; 74/665 L; 74/667 P
[51] Int. Cl................................................ B63h 5/08
[58] Field of Search..... 115/37; 74/409, 411, 665 E, 74/665 L, 665 N, 665 P, 339; 60/97 S; 318/13, 8, 48

[56] References Cited
UNITED STATES PATENTS
2,255,773 9/1941 Heftler.......................... 74/665 L
3,020,775 2/1962 Musser............................... 74/409
3,478,620 11/1969 Shimanckas........................ 115/37

FOREIGN PATENTS OR APPLICATIONS
164,642 9/1958 Sweden............................ 115/37

Primary Examiner—Albert J. Makay
Assistant Examiner—Donald W. Underwood
Attorney, Agent, or Firm—Toren, McGeady and Stanger

[57] ABSTRACT

A geared marine drive comprising two or more propeller shafts each driven by its own engine has interconnection means synchronizing the rotation of the propeller shafts. The interconnection means take the form of first and second gear connections at least partly in parallel with each other, the respective gear connections in a manner known per se being given preloading torques acting in opposition to each other, whereby play in the drive is removed and normal torsional vibrations of the drive do not cause hammering.

5 Claims, 1 Drawing Figure

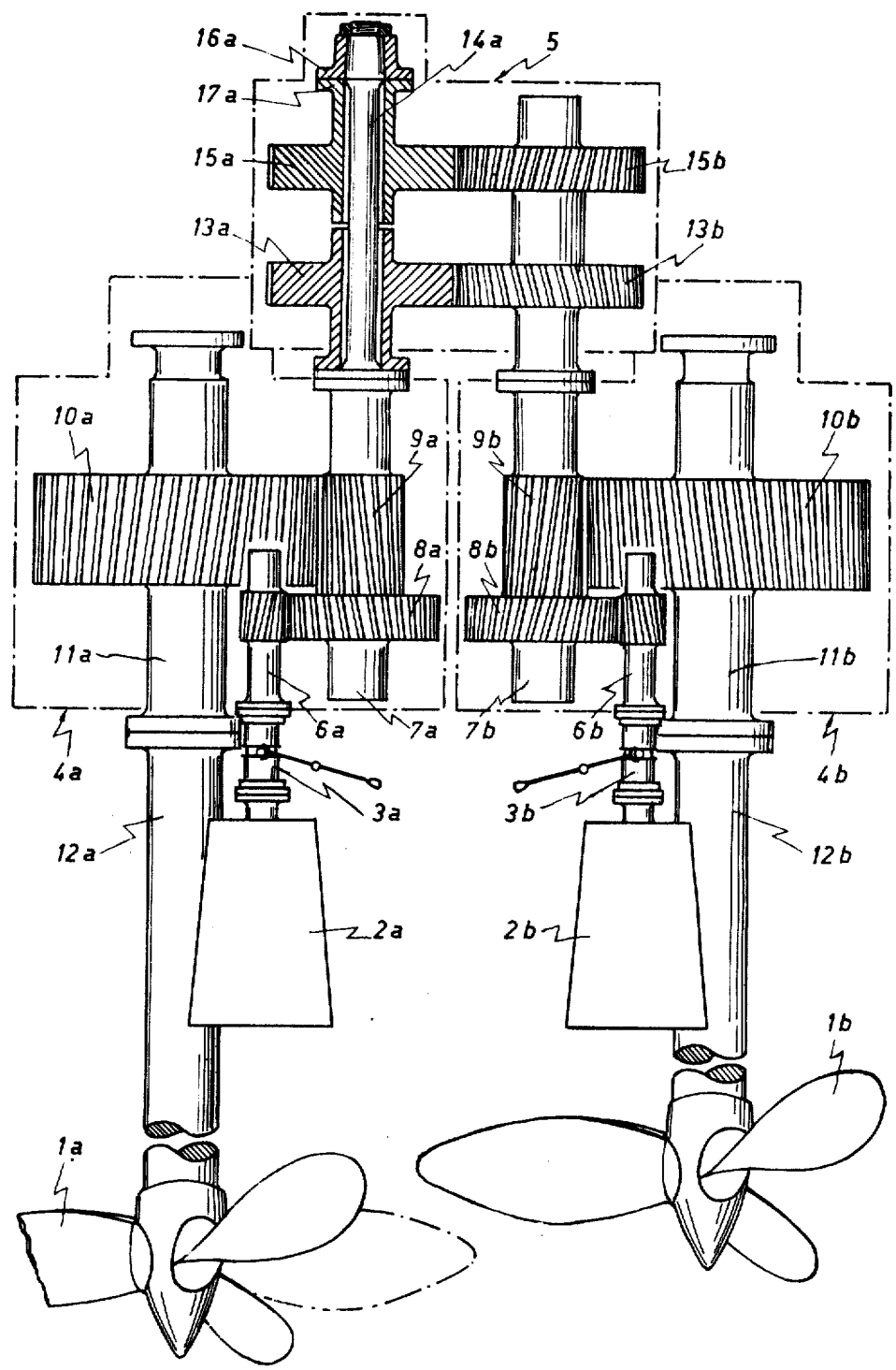

MARINE DRIVE GEARING

This invention relates to gear drives for a twin or multi screw marine propulsion arrangement having synchronously running propellers.

In marine propulsion units having two or more propellers, each of which is driven by its own engine, it is known to provide a gear connection between the propeller shafts. In normal operation the connection only has to ensure that the propellers are rotated in synchronism, accurate synchronism being particularly necessary when the pitch circles of the propellers overlap radially (i.e. as seen in the axial direction) since any difference in the rates of rotation can result in the two propellers having a mutually disturbing influence. The existence of a gear connection between a pair of separately driven propeller shafts has the additional feature that, in the event of failure of one engine, the associated propeller can also be driven by the engine of the other propeller. Consequently, it is customary to design this gear connection to be able to transmit at least 50% of the rated torque of each individual propeller.

With synchronously running propeller systems having the propellers radially adjacent to one another, and more especially propellers which overlap one another radially, torsional vibrations can also occur when the propellers are synchronously driven and with the same torques. With these operating conditions there is zero torque in the geared connection provided for synchronisation so that even the smallest torsional vibrations can lead to hammering. This hammering is unpleasant, not the least on account of the noise which is transmitted to the ship's hull, and in unfavourable circumstances it can considerably accelerate wear of the gearing.

The invention has for its object to provide a construction that can avoid this hammering effect.

The solution of this problem lies, according to the invention, in that in parallel with at least a part of the gear connection between the two propeller shafts there is a second gear connection and that both gear connections are preloaded in opposition to each other.

The increased expenditure which is required for this purpose is small, since the preloading or bracing moment only has to be as large as the maximum torsional vibration moment which occurs in order to prevent hammering. The second gear connection must likewise be designed to be as strong as the first connection and can be fitted in the same housing.

One important field of application of the invention is to marine gearing in which each propeller shaft may be driven from its own engine through a gear transmission including an intermediate shaft and the intermediate shafts are connected to one another by a pair of intermeshing synchronising gears. With such an arrangement, according to a preferred embodiment of the invention the second gear connection is formed by a second pair of synchronising gears, of which at least one is connected to the associated intermediate shaft through a torsion bar or tube.

However, it is also possible to provide a second gear connection, in the form of a direct connection between the shafts of the engines or between the propeller shafts themselves. It may even be expedient for both the engine shafts, on the one hand, and the propeller shafts, on the other hand, to be connected to one another by synchronising gears directly mounted on these shafts and to dispense with synchronising gears on the intermediate shafts. However, by connection of all synchronising gears to the intermediate shafts, as described above, a more compact arrangement is possible.

If a torsion bar or tube is provided for the mutual preloading of the two synchronising gear connections, then an arrangement for the adjustment of the loading of the torsion bar, preferably in a stepless manner, may be arranged between the torsion bar and an element of said synchronising gear connection to which the torsion bar is secured.

According to another preferred feature of the invention, a compact arrangement of the torsion bar or bars is provided by having the or each bar extending through hollow shafts or bosses of a synchronising gear secured to it and of a synchronising gear rigidly fixed on the associated intermediate shaft, and being connected to those ends of these two shafts or bosses which are remote from one another.

The invention is further explained hereinafter by reference to the accompanying diagrammatic drawing which shows one constructional example of the invention in plan view.

The drawing shows a ship's gearing for two propellers 1a and 1b, driven by respective engines 2a and 2b each through a clutch 3a or 3b and a two-stage reduction gear unit indicated generally by reference number 4a or 4b. The two reduction gear units 4a and 4b are themselves connected to one another by a synchronising gear transmission occupying the area indicated by reference number 5.

In each of the two reduction gear units 4a and 4b the constructional details are similar, like parts being identified by the same reference numbers in each but with the suffixes a and b in the respective units. It will therefore suffice to describe in detail one unit only. Thus, in the unit 4a a toothed driving shaft 6a can be connected to the engine 2a by a clutch 3a and the toothing of the shaft 6a meshes with a larger diameter gear 8a fixed on an intermediate shaft 7a. Fixed on the intermediate shaft 7a is a second gear 9a with a smaller number of teeth, this latter gear meshing with a considerably larger gear 10a on driven or output shaft 11a. Flanged on each of the output shafts 11a and 11b of the two reduction gear units is the shaft 12a or 12b respectively of the associated propeller 1a or 1b.

Flanged onto the intermediate shafts 7a and 7b are the respective shafts of synchronising gears 13a or 13b of the synchronising gear transmission 5. These two synchronising gears are directly in mesh with one another. The shaft or boss of the synchronising gear 13a is hollow and extending through it is a torsion bar or tube 14a, which is fixed at one of its ends to the flanged end of the intermediate shaft 7a, the end flange of the bar actually being shown clamped between the flanges of the intermediate shaft 7a and the shaft of the gear 13a.

The torsion bar 14a also extends through the hollow shaft of a second synchronising gear 15a arranged coaxially and in tandem with the synchronising gear 13a to which it is connected by the torsion bar as will be described below. The gear 15a meshes directly with a synchronising gear 15b, which, in the example illustrated is rigidly coupled to the synchronising gear 13b, but could also be connected to the latter through a torsion bar, in a similar manner to the connection of the gear 15a to the gear 13a. The two interconnections 13a, 13b and 15a, 15b are disposed in parallel, it will be noted.

Fixed on that end of the torsion bar 14a projecting from the hollow shaft of the gear 15a remote from the intermediate shaft 7a, is a bracing or preloading hub 16a, which in its turn can be firmly secured to a flange 17a on that end of the shaft of the synchronising gear 15a remote from the intermediate shaft 7a. The bracing or preloading hub 16a has a screw connection with the flange 17a which is engaged in such a position as regards torque load that the torsion bar 14a, and hence the entire synchronising gear transmission 5 is loaded with a reactive torque which is somewhat larger than the torsional vibration torques that can be expected to be set up in the propeller shafts 12a and 12b in operation.

In the static condition, the load distribution in the synchronising gear transmission 5 will be such that equal and opposite torques are applied between the gear pairs 13a, 13b and 15a, 15b. The production of this effect to a suitable degree in association with the preloading or biassing of the torsion bar 14a, prevents tooth flank play in the pairs of synchronising gears 13a, 13b and 15a, 15b, in the event of torsional vibrations in the propeller shafts 12a and 12b, and thereby avoids development of hammering phenomena.

What I claim and desire to secure by Letters Patent is:

1. Drive gear transmission for a pair of marine propellers comprising, in combination, a first propeller shaft for one of the propellers and a second propeller shaft for the other one of the propellers, respective drive means for rotating said first and second propeller shafts, and respective trains of drive gears connected to and rotated by said drive means, said gear trains being connected to said shafts to transmit the drives of said respective drive means to said first and second propeller shafts, mechanical interconnection means coupling said first and second propeller shafts together so that said propeller shafts rotate in synchronism, said interconnection means comprising a first gear interconnection and a second gear interconnection arranged in parallel and intermeshed engagement, preloading means associated with at least one of said first and second gear interconnections for applying opposite preloading torques to said first and second gear interconnections, each said drive gear train comprising an intermediate shaft, the gearing of said train connecting said intermediate shaft to said drive input means and to said propeller shaft, the respective intermediate shafts having said interconnection means secured to them, and said first and second gear interconnections each comprising a pair of gear wheels.

2. Drive gear transmission according to claim 1, wherein said preloading means comprises torsion loading means connecting at least one of said gear wheels of said second gear interconnection to its said intermediate shaft, and applying preloading torque between said first and second gear interconnections.

3. Drive gear transmission according to claim 2 further comprising means for adjustment of the preloading torsion in the torsion loading means, said adjustment means being connected between said loading means and said at least one gear wheel.

4. Drive gear transmission according to claim 2 wherein the torsion loading means comprises an elongate torsion bar or tube.

5. Drive gear transmission according to claim 2 wherein said first and second gear each comprise a pair of gear wheels connected to each intermediate shaft, the wheels of each said pair being disposed co-axially and in tandem, a tubular space extending co-axially through at least one of said pairs of gear wheels and said torsion loading means comprises a torsion bar or tube extending through said space and being connected to axially remote regions of said pair of gear wheels.

* * * * *